United States Patent [19]
Dale et al.

[11] 3,968,849
[45] July 13, 1976

[54] LIGHTWEIGHT PORTABLE SCALE
[76] Inventors: John D. Dale, 1211 W. Rovey Ave., Phoenix, Ariz. 85013; David G. Knotter, 4634 N. 44th St., Phoenix, Ariz. 85018
[22] Filed: Aug. 27, 1975
[21] Appl. No.: 608,231

[52] U.S. Cl. ............................................. 177/127
[51] Int. Cl.² ...................................... G01G 21/28
[58] Field of Search ........................... 177/126, 127

[56] References Cited
UNITED STATES PATENTS

| 327,152 | 9/1885 | Fitch | 177/127 |
| 379,746 | 3/1888 | Watt | 177/127 |
| 634,162 | 10/1899 | Bracktle | 177/127 |
| 3,082,833 | 3/1963 | Myers | 177/127 |

*Primary Examiner*—George H. Miller, Jr.
*Attorney, Agent, or Firm*—Warren F. B. Lindsley

[57] ABSTRACT

A lightweight portable pocket size scale, the balancing mechanism of which may be folded and contained in the bottom portion of a two piece case when not in use and which may accurately weigh small quantities of substances when the cover portion of the case is removed and the balancing mechanism is unfolded from its storage position in the bottom portion of the case.

7 Claims, 5 Drawing Figures

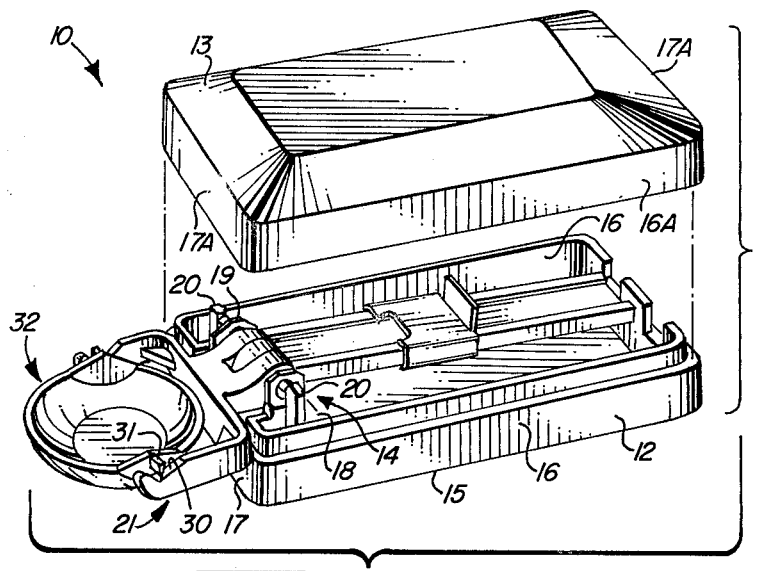
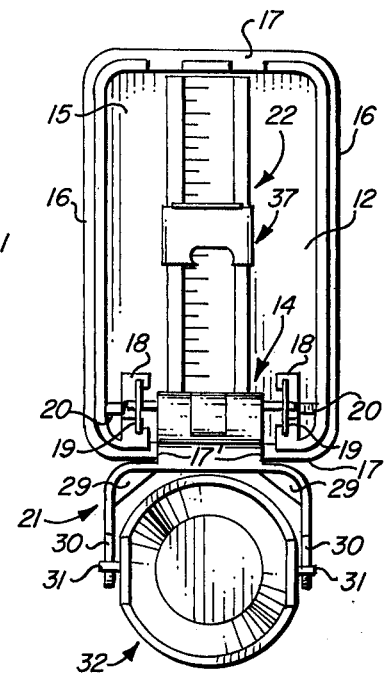
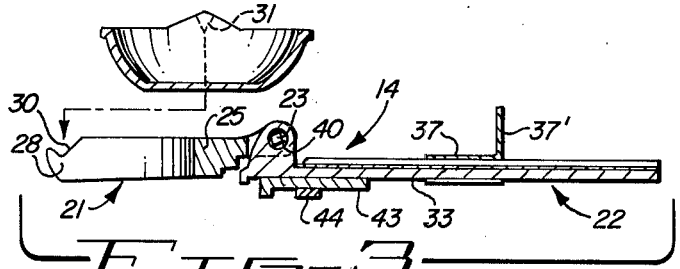
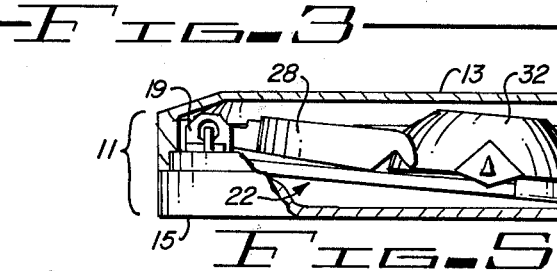
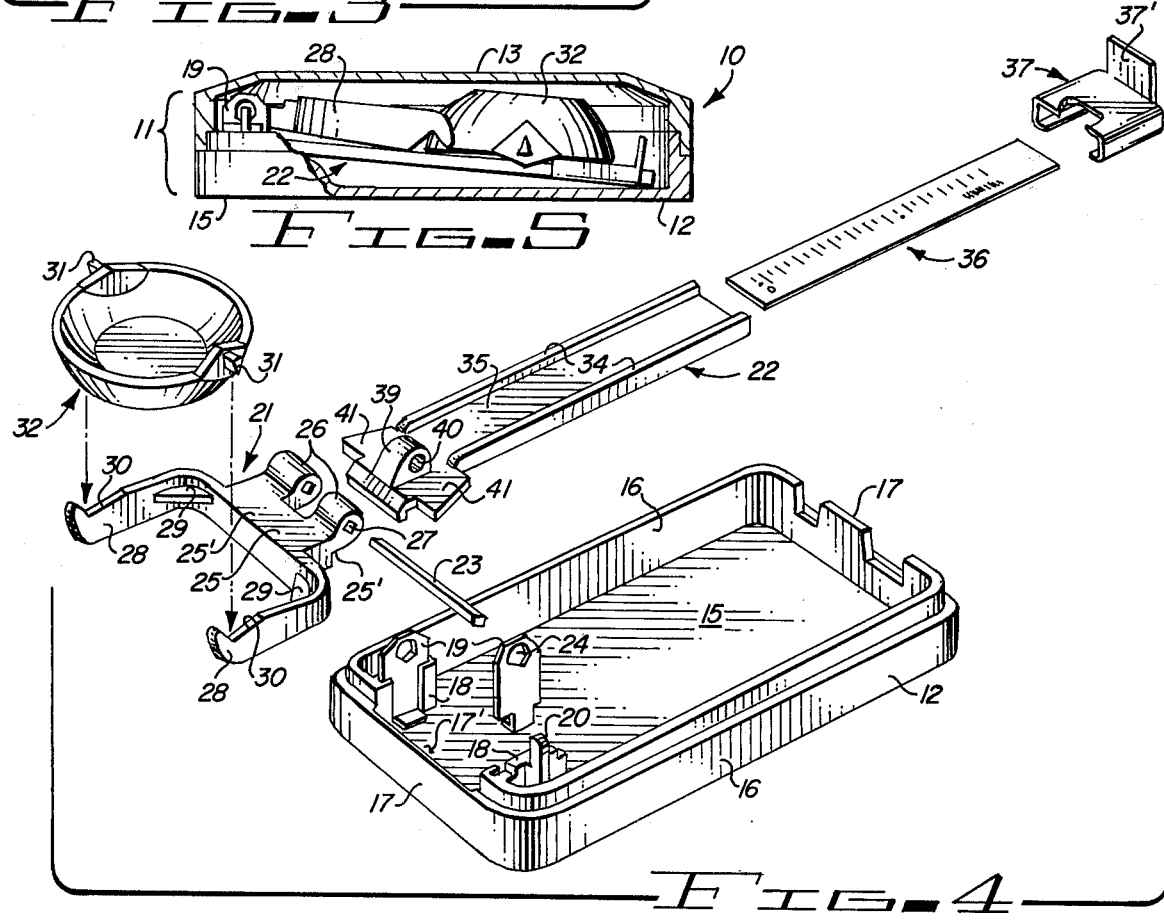

3,968,849

LIGHTWEIGHT PORTABLE SCALE

BACKGROUND OF THE INVENTION

This invention relates to scales and more particularly to scales of the balancing type that are intended for use in weighing small quantities of substances in the powdered, granular solid, or liquid form.

FIELD OF THE INVENTION

This invention relates to a miniature or pocket size scale of the balancing type that is capable of performing the function of accurately weighing small quantities of substances. All of the operating components are normally housed in a dust proof case when not in use and may be quickly and easily ready for use in performing its weighing function by the removal of the top cover portion of the case and expanding partially out of the case the balancing mechanism.

DESCRIPTION OF THE PRIOR ART

Heretofore many scales of the balancing type have been designed, manufactured and utilized for weighing extremely small quantities of various substances that weigh 1 or 2 grams, ounces or fractions thereof. Most of such scales employed the principle of balancing the weight of the substance with one or more separate, individual weight members that were placed on a level shelf on the opposite end of the scale's balancing arm until a state of equilibrium between the weight members and the substance being weighed is reached. Some scales of this type employed a sliding weight member that is adapted to be slid back and forth on a graduated scale connected to opposite ends of a balancing arm to obtain the necessary equilibrium to determine the weight of the substance.

Although some of the above described scales are accurate in performing the function of weighing small quantities of substances, they had many disadvantages among which are their high cost due to the precision and quality of materials required in their manufacture. Their heavy weight and bulkiness precludes ease of portability and their lack of suitable covering or enclosure means to protect them from the elements during periods of non-use of some of them are disadvantages affecting their commercial success.

SUMMARY OF THE INVENTION

In accordance with the claimed invention an improved scale of the balancing type has been provided which accurately weighs small quantities of substances.

It is therefore one object of this invention to provide a new and improved pocket size scale of the balancing type.

Another object of this invention is to provide an accurate miniature balancing type scale the components of which are completely enclosed in a carrying case when not in use.

A further object of this invention is to provide a miniature or pocket size version of a balancing type scale which may be made ready for instant use by simply removing the cover of the casing in which the assembled components are enclosed and unfolding one half of the balancing components from the bottom or base portion of the casing to an expanded position partially out of the case.

A still further object of this invention is to provide a miniature or pocket size scale of the balancing type having a removable, replaceable graduated scale and slidable balancing weight member associated with its lever arm employing scales having differnet graduations and indicia for visually determining the weight of the substance being weighed.

A still further object of this invention is to provide a miniature or pocket size scale of the balancing type that is inexpensive to manufacture, extremely light in weight, completely protected from the elements when stored or transported by a dust proof case, which may be quickly ready for use in weighing small quantities of substance to an accurate degree and wherein the mechanical components may be quickly and easily removed and replaced with new components when damaged or worn.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWINGS

FIG. 1 is an exploded perspective view of a light weight, portable scale of this invention with the cover portion of the case removed from the base portion and wherein the mechanical components of the scale are ready to perform their weighing function.

FIG. 2 is a plan elevational view of the base portion of the case and scale shown in FIG. 1 illustrating a further view of the mechanical components of the scale.

FIG. 3 is a central longitudinal cross-sectional view of the mechanical balancing components of the scale shown in FIG. 1 in their assembled relationship when unfolded and removed from the base portion of the case.

FIG. 4 is an exploded perspective view showing all of the associated elements of the scale with the exception of the case and its cover in their relative disassembled relationship.

FIG. 5 is a central longitudinal view, partly in section and broken away, showing the assembled mechanical balancing components folded into the base portion of the case and the relationship of the cover to the same when snapped into place enclosing the components.

DESCRIPTION OF THE PREFERRED EMBODIMENT

Referring more particularly to the drawing by characters by reference, FIGS. 1, 2 and 3 illustrate a lightweight portable scale 10 of this invention in its operative and storage positions comprising a two piece container or case 11 consisting of a base portion 12 and a cover portion 13. The cover portions 12 and 13 when snapped together over the previously folded and partly disassembled mechanical balancing components 14 shown in FIG. 3 are adapted to form a dust proof enclosure for the sensitive balancing components 14 of the scale.

The two piece case 11 and most of the balancing components are preferably made of a high impact strength plastic material which protects the sensitive parts of the scale from damage due to accidental dropping, misuse or handling and eliminates excessive weight of the complete unit.

The base portion 12 of the case comprises a flat bottom 15 having vertical side walls 16 and end walls 17 extending laterally therefrom in the same direction to form a box. The ends of walls 16 and 17 are grooved to mate with similarly formed side walls 16A and end walls 17A of the cover portion 13 of the case so that the two pieces can be snapped together in tight relationship or separated to gain access to the balancing mechanism.

The base portion 12 is also provided at one end in close proximity and in parallel relationship with side walls 16, a pair of vertically projecting, integral, rectangular shaped bosses 18. These bosses are provided with longitudinal, vertically extending slots and vertical cutouts in their opposed inner faces which are adapted to receive in removable relationship an identical pair of fulcrum or pivot shaft support members 19. The vertical center lines of the support members are in spaced parallel and horizontal relationship with the adjacent end wall 17 and side walls 16 of the base portion of the case. The vertical bosses 18 are also provided with integral vertically positioned extensions 20 which are aligned with the vertical center lines of the opposed bosses and pivot shaft support members 19 and extend transversely from the rear faces of the bosses to the side walls 16 of the base 12 of the case.

The balancing or weighing mechanism 14 of the lightweight portable scale of this invention comprises a unique arrangement of the assembled components which includes a balancing lever arm comprising two separate pieces. A yoke portion 21 of the lever arm comprises one portion and a scale portion 22 comprises the second portion. The lever arm is assembled and mounted in fixed and rotative relationship on a common fulcrum or pivot shaft 23 which shaft is journaled in suitably shaped and aligned apertures 24 formed in the pivot shaft support members 19. This structure is adapted to function as a single lever arm balancing unit having the advantage of quick and easy assembly or disassembly and capability of being folded into a compact single unit when assembled in the base portion 12 of case 11.

The yoke portion 21 is formed to provide a rearwardly extending hinge portion 25 having a transversely extending bifurcated, cylindrical shaped boss formed on its outer end to provide an identical pair of aligned, spaced hinge members 26. The width of hinge portion 25 is sized to fit with clearance between the pivot shaft support members 19 and a cutout portion 17' in the vertical end wall 17 of the base portion 12 of case 11 when operatively mounted therein.

The aligned hinge members 26 are provided with centrally aligned square apertures 27 formed with their across-corner center lines in vertical and horizontal alignment. The flat top and underside surfaces 25' of hinge portion 25 are sized to receive in sliding, non-rotative relation the preferably square sectional fulcrum or pivot shaft 23.

The yoke portion 21 of the balancing mechanism 14 includes a pair of forwardly extending parallel arms 28 that are integral with the rearwardly extending hinge portion 25. A pair of integral inside corner stiffening reinforcements 29 are adapted to maintain the parallel alignment of arms 28. Arms 28 are further provided at their outer ends with angular depressions 30, the inverted vertexes of their angular sides being slightly rounded and in exact horizontal and vertical alignment with each other so as to serve as a level fulcrum point or rest for the bottom edge of a pair of wedge-shaped, depending projections 31 that extend outwardly from opposite sides in transverse alignment of a removable replaceable substance holding cup 32. Cup 32 may be formed of any desirable shape or form so long as it is sized to fit in free pivoted, swinging relationship on its fulcrum points between the inside faces of the parallel arms 28 and the hinge portion 25 of yoke portion 21.

The scale portion 22 of the balancing mechanism comprises a flat, elongated lever arm 33 that may be substantially rectangular in cross-section having upwardly projecting sides between which and on the smooth flat top surface 35 of which a suitably graduated scale 36 may be permanently laminated to or removably mounted on as especially shown in FIGS. 1 and 2 of the drawings. The lever arm and scale assembly is provided with a suitable slide member 37 that is adapted to surround the same in a slight friction relationship. This slide member is provided with a vertically projecting finger grip portion 37' that is intended for use in moving the slide member back and forth over the scale on the lever arm to thereby provide a visual direct reading of the weight indicia on the scale.

The front end of lever arm 33 is formed with an integral vertically extending hinge member 39 that is located on the exact longitudinal center of the same. This hinge member is slightly less in width than the open space between the pair of hinge members 26 that are formed on the rearwardly extending hinge portion 25 of yoke 21 so as to fit snugly in free rotative relationship therebetween when the scale portion 22 is mounted on the pivot shaft 23 in assembled relationship with the yoke portion 21 of the scale.

Hinge member 39 is provided with a suitably sized bore 40 the diameter of which is slightly larger than the across-corners dimension of the square pivot shaft 23 on which it is to be mounted in free rotative relationship. The movement of hinge member 39 is limited and controlled by the contact of a pair of flat transverse interference side extensions 41 with the flat underside surfaces 25' of the aligned hinge members 26 to thereby transfer any radial or rotative movement of the yoke portion 21 of the scale to the scale portion 22 of the same. When hinge members 26 and 39 are mounted and assembled on pivot shaft 23 they move in unison in the manner of a single, one piece lever arm mounted in or on a central pivot point. This construction being desired in order to accomplish the folding action of the two main components of the scale.

It should be noted that when the yoke portion 21 and scale portion 22 are pre-assembled by means of the insertion of the square pivot shaft 23 into one of the square apertures 27 of the hinge members 26, bore 40 in the hinge member 39 and through the other square aperture 27 in the aligned hinge member 26, that only the scale portion 22 of the sub-assembly is free to rotate about the axis of the pivot shaft 23. Any radial, rotative movement of yoke portion 21 will be transferred to the pivot shaft itself because of its fixed relationship in the square, through apertures 27 in the hinge members 26 of the yoke.

Therefore to accomplish the balancing action of the assembled yoke and lever arm portions of the scale, the square pivot shaft 23 is made long enough to extend out beyond the side faces of the hinge members 26 a sufficient distance on each side to allow for insertion of the shaft ends in and through a pair of transversely aligned holes 24 that are formed in the upper ends of the pivot shaft support members 19. These holes may be of hexagon or partially square configurations so long as their bottom edges are formed with an angular relationship (of about 15°) that intersects on their vertical center lines to form inverted vertexes that serve as fulcrum points for the bottom square corner of the pivot shaft 23. With shaft 23 so mounted in the aligned holes 24 it is capable of radial movement in either direction about said pivot point or fulcrum.

The flat elongated lever arm 33 of the scale portion 22 is also provided with a weight adjustment balancing member 43 that is secured in sliding relationship to the underside flat surface of lever-arm 33 by means of a depending loop 44. Loop 44 is integrally formed on the underside of the arm and may be utilized to obtain equalibrium or balance between the yoke portion 21, empty holding cup 32 and the scale portion 22 when the slide member 37 of the same is at zero "0" position on the graduated scale 36. By simply sliding the weight adjusting member 43 forward or rearward, equilibrium or balance of the assembled components may be obtained.

OPERATION AND USE

With the portable scale 10 contained in its partly assembled and folded storage position in the two-piece container or case 11 as shown in FIG. 5 of the drawings, it is only necessary to remove the cover portion 13 of the case, remove the substance holding cup 32 from its storage position and unfold or rotate yoke portion 21 about the axis of the fulcrum or pivot shaft 23. The ends of shaft 23 are mounted in the vertex of the angled bottom edges of the aligned holes 24 in the pivot shaft support members 19 which is assembled in the base portion 12 of the case. By placing the holding cup 32 with its wedge shaped depending projections 31 in the inverted vertex of angular depressions 30 at the ends of the forwardly extending parallel arms 28 of the yoke portion 21, the scale is ready for the accurate weighing of small amounts of substance.

With the above accomplished it is only necessary to adjust the position of the sliding, weight adjustment, balancing member 43 to bring the components of the yoke portion 21 and scale portion 22 into balance or equalibrium when the slide member 37 of the scale is at zero "0," as previously described. Proceeding then to place a small amount of the material or substance to be weighed in the holding cup 32, the weight of which will immediately cause the yoke portion 21 to drop down or rotate radially about the axis of the pivot shaft 23. Shaft 23 will also be rotated radially by virtue of its fixed position in the square apertures 27 in the hinge members 26 of the yoke. Its pivotal mounting in the inverted vertexes of the aligned holes 24 in the pivot shaft support members 19 will permit the holding cup 32 with the substance being weighed to remain in a level relationship at all times by virtue of its pivotal mounting in the inverted vertexes of the angular depression in the outer ends of the forwardly extending parallel arms of the yoke portion 21, thereby making it feasibly possible to even weigh liquids without spilling a drop.

As the yoke portion 21 and the holding cup 32 is rotated radially, downwardly about the axis of the pivot shaft 23 by the weight of the substance in the cup, the flat underside surfaces 25' of the hinge members 26 come into contact with the flat transverse side extensions 41 at the front end of the lever-arm 33, thereby causing the same to be rotated radially, upwardly about the corners of the square pivot shaft 23. This action causes the lever-arm or scale portion 22 to assume this out of balance position and it is only necessary to move the slide member 37 outwardly away from the "0" point on the scale a sufficient distance to obtain balance or equalibrium of the load carrying and scale carrying lever-arm components to provide a visual direct reading of the weight of the substance on the graduated scale.

After use of the scale, for purposes of storage or transportation, the components of the same may be folded into the base portion 12 of the case and the cover portion 13 installed on and over the same, as previously described, to thereby provide a dust proof enclosure for the assembled light weight scale 10 and holding cup 32.

It should also be noted that the miniature portable scale of this invention has been described as being especially useful for weighing small quantities of substance such as powders or granular material and the indicia on the scale 36 would indicate grains or grams from "0" weight up to about "2 " grams. It is feasible and easily accomplished to remove such a scale and replace the same with a scale having its indicia and graduations marked off in units or fractions thereof up to 1 or 2 ounces, for the purpose of weighing small amounts of liquids or light weight solids and that the scale and its case could be made somewhat larger for weighing larger amounts of material, without departing from its novel design and portability features.

Although but one embodiment of the invention has been shown and described, it will be apparent to those skilled in the art that changes and modification may be made to the apparatus shown and described herein without departing from the scope of the appended claims.

What is claimed is:

1. A lightweight miniaturized portable scale comprising:
    a carrying case comprising a base portion and a cover portion,
    a pair of shaft support members spacedly mounted within said base portion and arranged to extend laterally of the longitudinal axis of said base portion each adjacent a different side thereof,
    a collapsible weighing mechanism comprising a yoke portion having a pair of spaced arms, a scale portion and a shaft,
    said shaft being non-rotatively attached to said yoke portion with each end fulcrumed on a different one of said support members,
    said scale portion being pivotally mounted on said shaft and comprising interference means for engaging said yoke portion and for transmitting given rotative movement of said yoke portion to said scale portion,
    a scale having indicia thereon mounted on said scale portion along its length,
    a slide member slidably mounted on said scale portion, and
    a cup fulcrumed between said arms of said yoke portion for holding the substance to be weighed.

2. The lightweight miniaturized portable scale set forth in claim 1 wherein:
    said cover portion is detachable from said base portion and engages said base portion with an interference but along its edges.

3. The lightweight miniaturized portable scale set forth in claim 1 wherein:

said yoke portion when in its normal weighing position has its arms extending longitudinally from the pivotal mounting of said scale portion, and extending over the pivotal mounting of and one end of said scale portion when collapsed and folded within the outline of said base portion when said case is closed with said cover portion.

4. The lightweight miniaturized portable scale set forth in claim 1 in further combination with:
a weight adjustment means slidably mounted on the base of said scale portion for aiding in obtaining equilibrium between said yoke portion, cup and the scale portion when said slide member is at zero position of said indicia on said scale portion.

5. The lightweight miniaturized portable scale set forth in claim 1 wherein:
said carrying case is formed of plastic.

6. The lightweight miniaturized portable scale set forth in claim 1 wherein:
the ends of said shaft are fulcrumed within apertures in said support members.

7. The lightweight miniaturized portable scale set forth in claim 1 wherein:
each of said pair of arms are provided with V-shaped notches for cooperating with a pair of support means mounted on diametrically opposed sides of said cup for engaging and mounting in the manner of a fulcrum said cup on said arms.

* * * * *